United States Patent Office 3,498,812
Patented Mar. 3, 1970

3,498,812
PROCESS FOR MAKING CELLULOSE TRIESTER SPINNING DOPE
Henry W. Steinmann, Sparta, N.J., assignor to Celanese Corporation, New York, N.Y., a corporation of Delaware
No Drawing. Continuation of application Ser. No. 583,415, Sept. 30, 1966. This application Dec. 18, 1968, Ser. No. 786,831
Int. Cl. C08b 3/14
U.S. Cl. 106—176      7 Claims

ABSTRACT OF THE DISCLOSURE

A process for the conversion of cellulose triester esterification dope containing excess esterification acid to a cellulose triester spinning dope by means of the addition of an amine derivative to the esterification dope, the amine derivative having the ability to precipitate the unreacted esterification acid.

---

This application is a continuation of application Ser. No. 583,415, filed on Sept. 30, 1966, and now abandoned.

This invention relates to the preparation of cellulose triesters and more specifically to the purification of cellulose triester esterification dope.

The most commercially important of the cellulose triesters is cellulose triacetate. In the so-called solvent process for the preparation of cellulose triacetate, acetylation of cellulose is achieved with acetic anhydride in the presence of small amounts of strong acid catalyst employing solvents such as methylene chloride. The quantity of acetic anhydride for acetylation is 5–10% in excess of that required to react with the cellulose. The reaction which takes place is the reaction of hydroxyl groups of cellulose with the acetylating agent resulting in cellulose triacetate and acetic acid. Upon completion of the esterification reaction, water is added in stoichiometric quantities to react with the remaining acetic anhydride and the acid catalyst is neutralized with a base. The product at this point is known as acetylation dope and is not suitable for fibers spinning until the neutralized catalyst and acetic acid have been removed, after which the product is known as spinning dope. Heretofore, spinning dopes have been obtained from acetylation dope by precipitation of cellulose triacetate flake from the acetylation dope, followed by washing and drying of the precipitated flake. The cellulose triacetate flake is then re-dissolved in methylene chloride or other suitable solvents and is then satisfactory for use as a spinning dope. Removal of cellulose triacetate flake from the acetylation dope rather than extraction of the impurities themselves is primarily due to the fact that the economics of the process demand recovery of the acetic acid, that is to say, any method employed for the removal of acetic acid must be such that the acetic acid itself is readily recoverable and convertible to acetic anhydride. While precipitation of cellulose triacetate flake from the acetylation dope is one means by which substantially pure cellulose triacetate may be obtained, and yet allow for the easy recovery of acetic acid, it is readily apparent that a process which would by-pass the precipitation of cellulose triacetate flake, would be an economic advance in the process and would also allow for a continuous rather than a batch process for the preparation of cellulose triester extrudates. It is therefore, an object of this invention to provide a process for the preparation of cellulose triester spinning dope directly from cellulose triester esterification dope without the step of precipitating cellulose triester flake.

It is another object of this invention to provide a process for the removal of esterification acid by precipitation from cellulose triester acetylation dope in a manner whereby the esterification acid is readily recoverable.

It is a further object of this invention to provide a continuous process for the preparation of cellulose triester spinning dope that gives more uniformity in the resulting extrudate.

It is still another object of this invention to produce a novel shaped article from a process which produces a cellulose triester spinning dope directly from a cellulose triester esterification dope.

In accodrance with this invention, it has now been discovered that the esterification acid may be removed from cellulose triester esterification dope by precipitation of the acid with an amine derivative in the presence of an esterification dope solvent. The amine derivative is preferably a derivative containing the radical

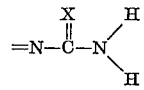

X is a member selected from the group consisting of O and N. Amine derivatives which are especially suitable for purposes of this invention are melamine, melamine formaldehyde, and urea. The most prefered amine derivative of this invention is melamine. When the cellulose triester is cellulose triacetate, and the amine derivative is melamine, the melamine acetic acid complex that is formed can vary from the monoacetate to the triacetate of melamine. The melamine and acetic acid can readily be recovered by heating the complex. The amounts of acetic acid which precipitate out as a white solid complex depend on the amount of melamine added. When 1.5 parts by weight of melamine are added per part of acid in the dope 96 to 99% of the acetic acid is precipitated. Using less melamine will precipitate less acetic acid, for instance, with 0.8 to 1.1 parts by weight of melamine per part of acetic acid, about 75 to 90% of the acetic acid is precipitated. It is therefore, preferred that not less than 1.5 parts of melamine be added per part of acid in the dope.

The process, thus, for converting acetylation dope to spinning dope without flake precipitation consists essentially of the following steps:

(1) Neutralization of catalyst with alkali or alkaline earth salts and removal of the resulting sulfate by filtration or centrifugation.

(2) Addition of melamine which precipitates 96–99% of the acetic acid.

(3) First filtration which gives a residue consisting of the melamine-acetic acid complex and a filtrate containing from 1–4% of the total acetic acid. Dilution with methylene chloride may be desirable prior to filtration. Also, it is desirable to wash the filter cake with fresh methylene chloride to remove adhered cellulose triacetate. The wash liquor is recycled; that is, it is used to dilute the dope prior to the first filtration.

(4) Concentration to proper spinning concentration and viscosity by distilling off excess methylene chloride. The methylene chloride distillate is recycled; that is, it is used to wash the filter cake in the first filtration.

It may be desirable to neutralize residual acetic acid in the dope. This can be done before or after concentrating the dope. A second filtration is then desirable to remove the salt formed from the neutralization of the residual acetic acid with base. Or alternately, the residual acetic acid can be removed by contacting the dope with strong base ion exchange resin. In such case it is desirable to carry out this operation prior to concentrating the dope.

As previously stated, the most commercially important cellulose triester is cellulose triacetate and more specifically cellulose triacetate containing more than 59% and preferably more than 61% of acetyl groups calculated as combined acetic acid. It should be understood however, that other cellulose triesters come within the scope of this invention. A significant group of materials falling within this category are cellulose triesters of acids such as acetic, formic, propionic, butyric and the like which contain fewer than about 0.29 and preferably fewer than 0.12 free hydroxyl groups per anhydroglucose units in the cellulose molecule.

The reaction of melamine and acetic acid in the dope is only slightly exothermic. The precipitated complex remains substantially insoluble in the dope if the latter is diluted with methylene chloride or small amounts of methanol or acetone. The precipitated complex also remains substantially insoluble in this dope in the presence of a small amount of water. However, the small residual amount of acetic acid that is found in the filtrate following filtration is probably due to the liability of the melamine-acetic acid complex thereby causing a small amount of acetic acid to be in the free state. Also there is a tendency for the presence of a small amount of colloidal melamine and/or melamine-acetic acid complex in the filtrate. The percent residual acetic acid may also be related to a slight solubility of the melamine-acetic acid complex in the system which may vary with the concentration of cellulose triacetate, amount of melamine used, amount of methylene chloride and other solvent additives such as water or methanol.

It should be understood that the presence of melamine in the spinning dope and consequently in the final shaped product such as a fiber may be beneficial. If, for instance, the fiber product is subsequently converted to a fabric by weaving or knitting operation, flat drying properties may be imparted to the fabric by treatment with an aldehyde. An aldehyde resin such as melamine-formaldehyde may be formed in situ, thus stabilizing the fabric and enhancing the fabric's flat drying qualities.

The melamine-acetic acid complex is readily separated from the dope by filtration. The dope is preferably diluted with methylene chloride to enhance filtration. It has been found that addition of methanol or acetone also improves filtration, especially if water is present in the system. It has also been found that the addition of small amounts of surfactants, especially cationic surfactants, result in faster rates of filtration.

After filtration, the dope can be concentrated to the proper spinning concentration and viscosity by evaporating or distilling methylene chloride. At this point it is desirable to neutralize the small amount of residual acetic acid in the dope by using stoichiometric amounts of bases such as sodium hydroxide, magnesium oxide, ammonium hydroxide and the like. The dope is then filtered and ready for spinning. Alternately, the residual acetic acid can be neutralized and the dope filtered prior to concentration to the proper spinning concentration and viscosity. It is realized that the filtered dopes are useful for spinning into fibers or casting into films.

It has been found that if the melamine is first recrystallized from water, dried and then used, reasonably clear filtrates can be obtained. It has also been discovered that if colloidal material is present, it can be readily coagulated by giving the dope a heat treatment in the presence of a small amount of aqueous formaldehyde. The latter probably reacts with the colloidal melamine or melamine-like impurities giving coagulated, insoluble products. Heat treatment in the presence of a small amount of water or methanol tends to give clearer filtrates, but the treatment is not as effective as when formaldehyde is present.

The precipitation of acetic acid with melamine from dopes of cellulose triacetate in methylene chloride is very effective. The use of other amine derivatives such as melamine formaldehyde resin and urea is not as effective. Urea will precipitate acetic acid to some extent especially when the dope is cooled below 16° C. but the treatment is not as effective as melamine. The criterion for the selection of the agent to precipitate the esterification acid is the solubility of both the reagent and its compound formed with esterification acid and the ability of the precipitate product to be regenerated back to the reagent and the acid. Ammonia can be used to neutralize any unprecipitated acid. Salts, such as, for instance, ammonium acetate, which are formed in neutralizing acetic acid, are insoluble in the dope and can be separated by filtration or centrifugation. The ammonia and acetic acid can be recovered by hydrolysis of the ammonium acetate at elevated temperatures. However, maximum removal with melamine is preferred over ammonia added removal because reaction of melamine with acetic acid is only slightly exothermic whereas that with ammonia is strongly exothermic thereby requiring considerable external cooling to control the neutralization.

It is important that the bonding of the reagent with acetic acid be strong enough and the formed compound insoluble enough in the dope to be removable and yet the bonding must not be so strong that the reagent and the acetic acid cannot be readily recovered. The advantage in use of melamine is the known fact that melamine monoacetate or melamine or melamine triacetate is unstable and liberates acetic acid especially when heated. The melamine-acetic acid complex obtained according to the process of this invention can be readily separated into melamine and 100% acetic by pyrolysis at elevated temperatures. The preferred temperature range is 125–225 C. The higher the temperature the shorter the time to completely regenerate the acetic acid and melamine. The regeneration is also enhanced by employing vacuum. All studies made showed that the regenerations were quantitative. Furthermore, it was found that when the regenerated melamine was repeatedly used to precipitate acetic acid from the dope, its capacity for acetic acid remained substantially unchanged with each recycle after regenerating at 225 C.

While the invention is not limited to the use of any specific apparatus to achieve the removal of the excess esterification acid with the amine derivative, one system which has been found to be suitable is a plurality of packed columns. The esterification dope is fed to the amine derivative packed columns by gravity feed, a preselected number of columns being taken out at regular intervals for regeneration after which the regenerated columns are again returned to the gravity feed line.

The following specific examples are given for purposes of illustration and should not be considered as limiting the spirit or scope of this invention.

EXAMPLE 1

254 grams of cellulose triacetate acetylation dope is prepared by conventional means, the dope containing 10.0 grams of acetic acid, 10.2 grams of cellulose triacetate (acetyl value of 61.6% acetic acid) and the remainder being methylene chloride. The dope is treated with 0.2 gram lauryl pyridinium chloride, 5 grams of $MgSO_4$ and 16 grams of melamine. After 30 minutes of intermittent stirring the suspension is filtered and the filter cake washed with 25 millimeters of methylene chloride, followed by a second filtration. The filtrate is then titrated for acetic acid content by the use of 1/10 normal sodium hydroxide and phenolphthalein indicator. Melamine is found to have removed 97.5% of the acetic acid present.

EXAMPLE 2

Melamine is recrystallized by dissolving in boiling water and then slowly cooling the solution. The white melamine crystals are collected, washed and then dried in a vacuum oven at about 60 C. Cellulose triacetate acetylation dope comprising 7.0 grams cellulose triacetate (acetyl value of 61.6% acetic acid), 263 grams of methylene chloride and 10 grams of acetic acid is treated with 16 grams of the recrystallized melamine. After about 30 minutes of intermittent stirring, the suspension is filtered through a sintered glass filter and the residue washed with 100 millimeters of methylene chloride. Titration with 1/10 normal sodium hydroxide using a phenolphthalein indicator is found to show that 98% of the total acetic acid is removed.

EXAMPLE 3

A cellulose tripropionate esterification dope containing 7.0 grams cellulose tripropionate, 263 grams of methylene chloride and 10 grams of propionic acid is treated with 16 grams of crude powdered melamine. After 35 minutes of intermittent stirring, the suspension is filtered through a sintered glass filter. Titration of the filtrate with 1/10 normal sodium hydroxide employing a phenolphthalein indicator is found to show that 82% of the propionic acid had been precipitated.

EXAMPLE 4

A cellulose tributyrate esterification dope containing 7.0 grams of cellulose tributyrate, 263 grams of methylene chloride and 10 grams of butyric acid is treated with 16 grams of crude powdered melamine. After 25 minutes of intermittent stirring the suspension is filtered through a sintered glass filter. Titration of the filtrate with 1/10 normal sodium hydroxide employing a phenolphthalein indicator is found to show that 76% of the butyric acid had been precipitated.

EXAMPLE 5

Cellulose triacetate acetylation dope containing 7.0 grams cellulose triacetate (acetyl value 61.6% acetic acid), 263 grams methylene chloride and 10 grams acetic acid is treated with 25 grams urea. After forty minutes of intermittent stirring, the suspension is filtered through a sintered glass filter. Titration of the filtrate with 1/10 normal sodium hydroxide employing a phenolphthalein indicator is found to show that 65% of the acetic acid had been precipitated.

EXAMPLE 6

Procedure of Example 5 is again repeated with the exception that the urea is replaced with 25 grams of melamine formaldehyde resin prepared from a melamine/formaldehyde molar ratio of 3:1. Titration of the filtrate with 1/10 normal sodium hydroxide employing a phenolphthalein indicator is found to show that 70% of the acetic acid had been precipitated.

EXAMPLE 7

A cellulose triacetate acetylation dope containing 7.0 grams cellulose triacetate (acetyl value of 61.6% acetic acid), 263 grams of methylene chloride and 10 grams of acetic acid is treated with 16 grams of crude powdered melamine. After thirty minutes of intermittent stirring, the suspension is filtered through a sintered glass filter. Titration of the filtrate with 1/10 normal sodium hydroxide employing a phenolphthalein indicator is found to show that 97.5% of the acetic acid had been precipitated.

EXAMPLE 8

The residue from Example 7 is collected and pyrolyzed in a forced draft oven at 225° C. for one hour, the time period being in excess of that required to completely regenerate the melamine at 225° C. The pyrolyzed residue is cooled and used over in a procedure identical with that described in Example 7. The procedure is repeated for a total of seven recycles with the results of the titration being as given in the following table:

| Cycle | Mls. 0.1 N NaOH for filtrate | Gms. HOAc in filtrate | Percent HOAc precipitated |
|---|---|---|---|
| 1 | 34.49 | 0.207 | 98.0 |
| 2 | 34.47 | 0.207 | 98.0 |
| 3 | 28.20 | 0.169 | 98.4 |
| 4 | 26.10 | 0.157 | 98.5 |
| 5 | 50.20 | 0.301 | 97.1 |
| 6 | 26.80 | 0.161 | 98.5 |
| 7 | 30.80 | 0.215 | 97.9 |
| 8 | 40.40 | 0.242 | 97.7 |

As can be seen from the table, there is no substantial change in the capacity of melamine to react with acetic acid after repeated regeneration at 225° C. nor is there any substantial loss of melamine during repeated cycling.

What is claimed is:

1. In a process for the conversion of an esterification dope, of a cellulose triester of a lower alkanoic acid containing unreacted esterification acid, to a cellulose triester spinning dope, the step of adding at least 1.5 parts by weight of an amine derivative per part of said unreacted esterification acid to the esterification dope said amine derivative being selected from the group consisting of melamine, melamine-formaldehyde and urea.

2. The process of claim 1 wherein said cellulose triester is selected from the group consisting of cellulose triacetate, cellulose triformate, cellulose tripropionate and cellulose tributyrate.

3. In a process for the conversion of an esterification dope, of a cellulose triester of a lower alkanoic acid containing unreacted esterification acid, to a cellulose triester spinning dope, the step of adding at least 1.5 parts by weight of melamine per part of unreacted esterification acid to the esterification dope whereby unreacted acid employed in the esterification step is precipitated.

4. The process of claim 3 wherein said cellulose triester is cellulose triacetate.

5. A process for the conversion of an esterification dope, of a cellulose triester of a lower alkanoic acid containing unreacted esterification acid, to cellulose triester spinning dope, the process comprising adding at least 1.5 parts by weight of melamine per part of unreacted esterification acid to the esterification dope and then filtering off the precipitate resultant from the reaction of melamine with unreacted acid employed in the esterification step.

6. The process of claim 5 wherein said cellulose triester is cellulose triacetate.

7. A process for the conversion of an esterification dope, of a cellulose triester of a lower alkanoic acid containing unreacted esterification acid, to a cellulose triester spinning dope comprising adding at least 1.5 parts by weight of melamine per part of unreacted esterification acid to the esterification dope, filtering out the resultant reaction product of melamine and unreacted acid employed in the esterification process and then regenerating the melamine esterification acid reaction product by means of pyrolysis.

References Cited

Beilstein's Handbuch der Organischen Chemie., vol. 3, third supp., page 109 (1961).
Perepechkin et al., Chem. Abs. 61, 759 (1964).
Thomas—J. Am. Chem. Soc. 75, 5346–5350 (1953).
Tochiku et al.—Chem. Abs. 51, 16570 (1957).

MORRIS LIEBMAN, Primary Examiner

H. H. FLETCHER, Assistant Examiner

U.S. Cl. X.R.

106—183, 186, 187, 189, 190, 198